(12) United States Patent
Zimmer

(10) Patent No.: US 6,691,366 B1
(45) Date of Patent: Feb. 17, 2004

(54) WIPER SYSTEM

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 351 days.

(21) Appl. No.: 09/830,266

(22) PCT Filed: Aug. 8, 2000

(86) PCT No.: PCT/DE00/02638
§ 371 (c)(1),
(2), (4) Date: Apr. 24, 2001

(87) PCT Pub. No.: WO01/15944
PCT Pub. Date: Mar. 8, 2001

(30) Foreign Application Priority Data

Aug. 27, 1999 (DE) .......................... 199 40 815

(51) Int. Cl.[7] .............................. B60S 1/24; B60S 1/06
(52) U.S. Cl. ................. 15/250.27; 15/250.31; 15/250.3; 15/250.14; 74/588; 74/51; 74/42; 74/43; 74/579 R
(58) Field of Search ........................ 15/250.3, 250.31, 15/250.27, 250.14; 74/42, 43, 70, 75, 51, 579 R, 588, 519

(56) References Cited

U.S. PATENT DOCUMENTS

| 3,016,766 | A | * | 1/1962 | Hoyler ........................ 384/276 |
| 3,025,554 | A | * | 3/1962 | Ziegler .................... 15/250.14 |
| 3,113,334 | A | * | 12/1963 | Howard .................... 15/250.14 |
| 3,144,672 | A | * | 8/1964 | Fehrenbach ............... 15/250.14 |
| 3,226,755 | A | * | 1/1966 | Fox et al. ................. 15/250.14 |
| 3,449,966 | A | * | 6/1969 | Stevens ..................... 74/579 R |
| 3,665,772 | A | * | 5/1972 | Beard et al. .................... 74/75 |
| 4,009,502 | A | * | 3/1977 | Tamaki et al. ........... 15/250.27 |
| 4,477,293 | A | * | 10/1984 | Timmis ......................... 74/42 |
| 5,213,008 | A | * | 5/1993 | Kanno et al. ............. 74/579 R |
| 5,473,955 | A |   | 12/1995 | Stinson |
| 5,680,792 | A | * | 10/1997 | Buhl et al. ...................... 74/42 |
| 5,823,065 | A |   | 10/1998 | Egner-Walter |

FOREIGN PATENT DOCUMENTS

| DE | 41 26 700 C | 10/1992 |
| DE | 199 12 746 A | 10/2000 |
| EP | 0 579 551 A | 1/1994 |
| EP | 0 781 691 A1 | * 7/1997 |
| EP | 0 953 488 A | 11/1999 |
| GB | 2 195 880 A | 4/1988 |

OTHER PUBLICATIONS

Hans Pischel, Wieloch "Bewaehrtes Innenhochdruckumformen", Zeitschrift "Werkstatt Und Betrieb" 128 (1995), 9,, Carl Hanser Verlag Muenchen, pp. 812–814.
Alfred Ebbinghaus:"Praezisions–Werkstuecke In Leichtbauweise . . . ", Sonderdruck Aus Metallumform–Technik, Claus Dannert Verlag 1994.

* cited by examiner

Primary Examiner—Gary K. Graham
(74) Attorney, Agent, or Firm—Michael J. Striker

(57) ABSTRACT

The invention is based on a wiper system having a wiper motor, which via a motor crank, seated on a motor shaft, and two connecting rods drives a drive shaft of two windshields wipers, wherein a first connecting rod is pivotably connected directly to the motor crank while a second connecting rod is connected to the first connecting rod, in spaced-apart fashion from the crank joint, via a joint.

13 Claims, 4 Drawing Sheets

Figure 1:
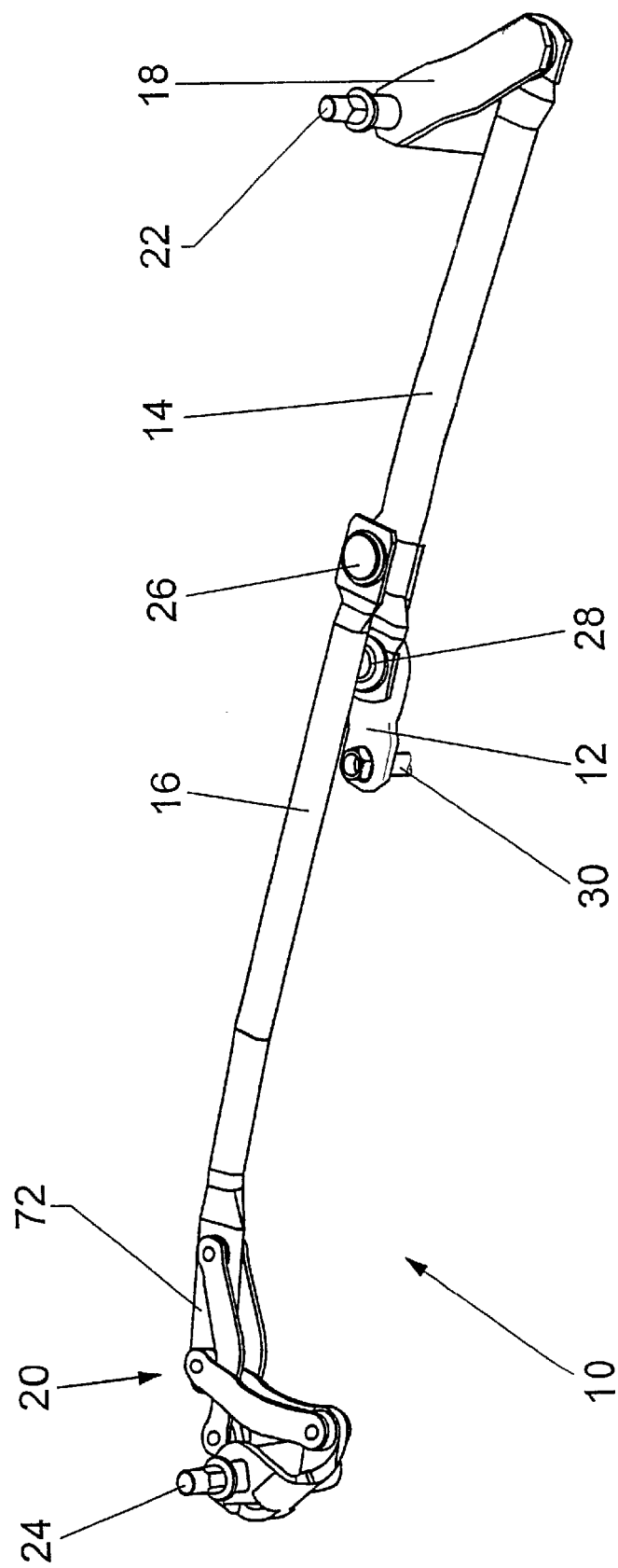

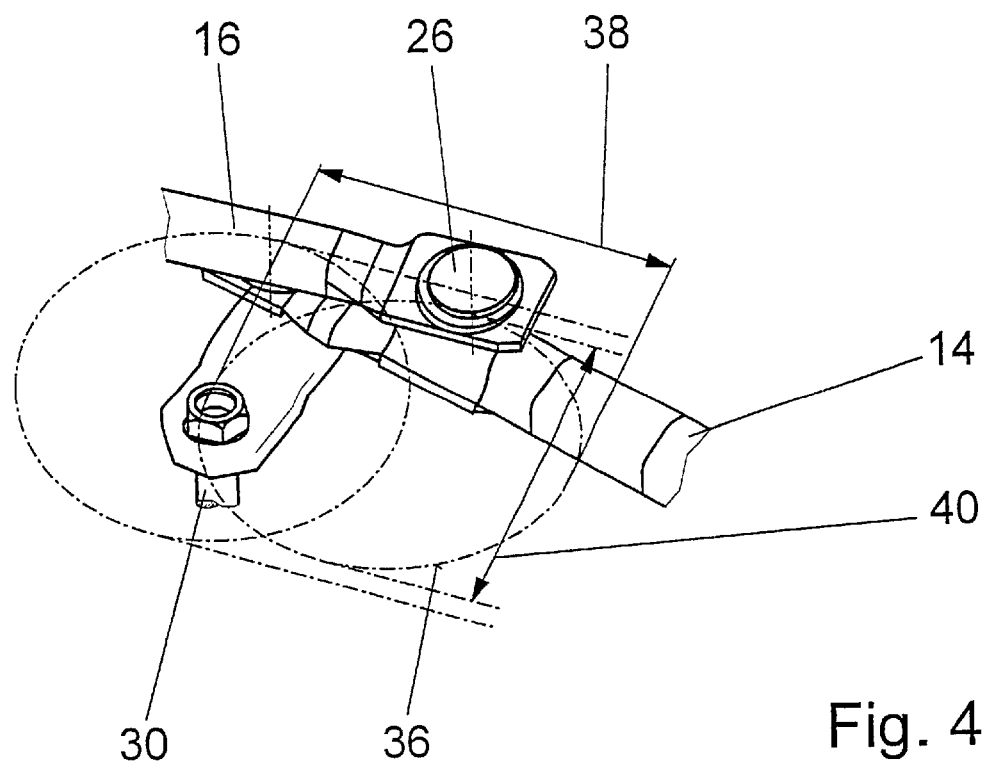
Fig. 4
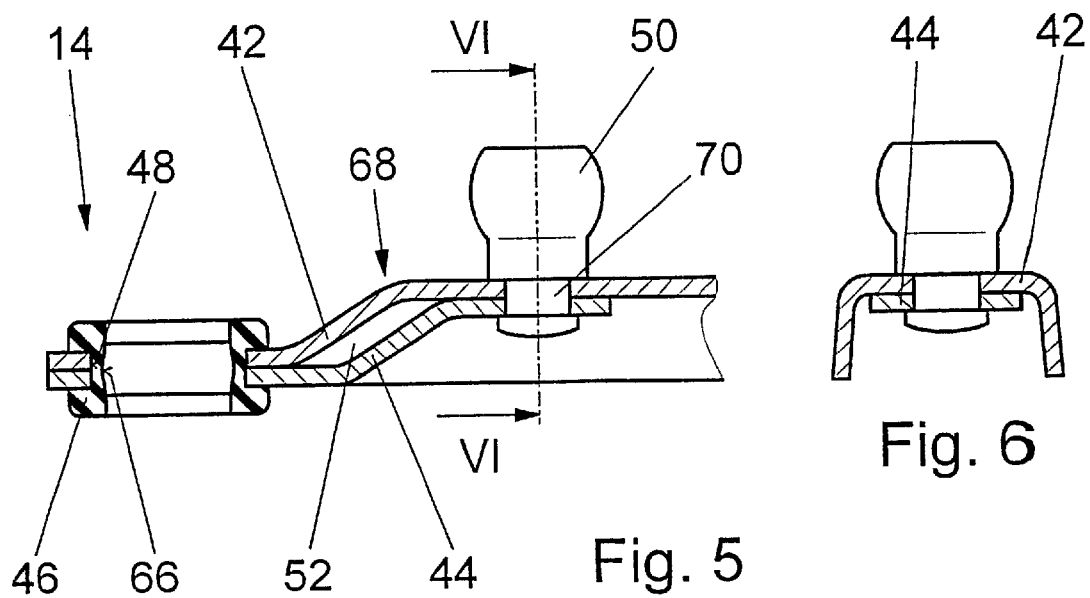
Fig. 5
Fig. 6

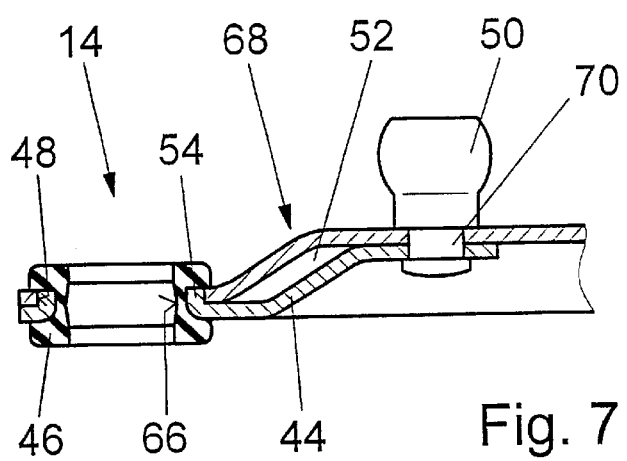
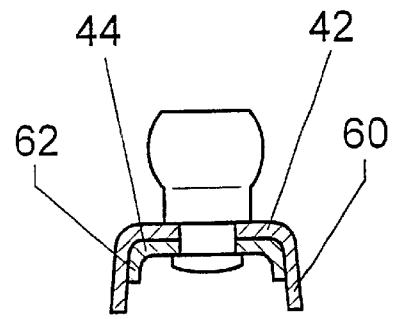
Fig. 7    Fig. 10
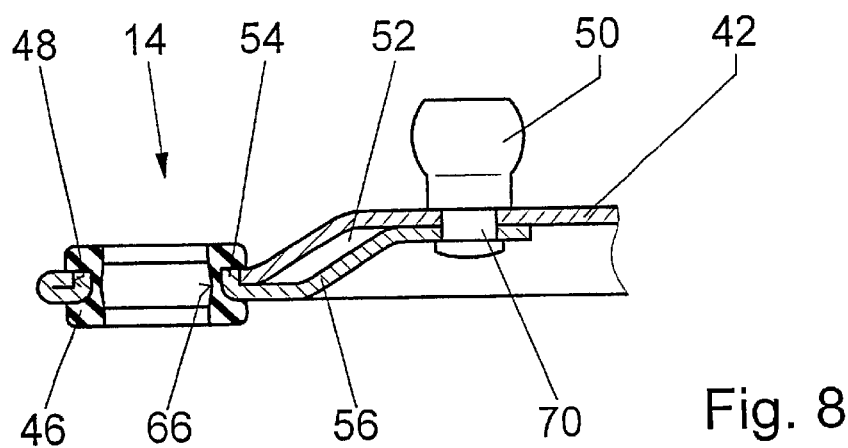
Fig. 8
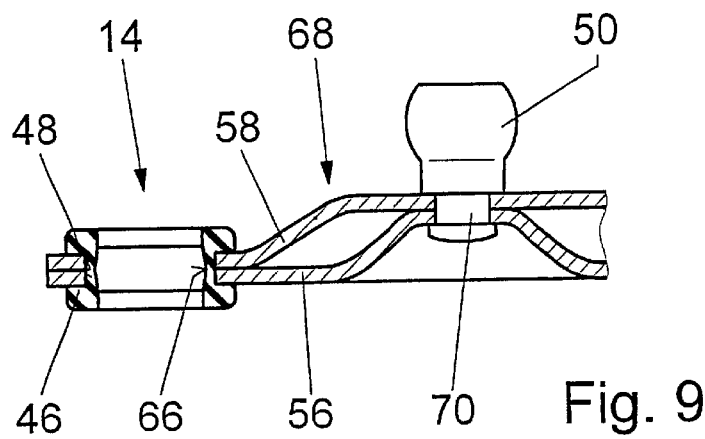
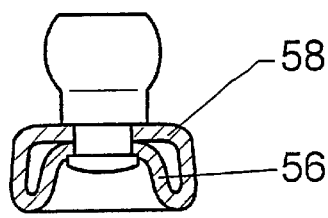
Fig. 9    Fig. 11

WIPER SYSTEM

BACKGROUND OF THE INVENTION

The invention is based on a wiper system.

Wiper systems with a plurality of windshield wipers for motor vehicles are secured by their wiper bearings directly or indirectly to the vehicle body via a mounting plate. The mounting plate or tubular mounting—if the wiper carrier also includes tubular hollow profiles—includes a motor mounting plate, which carries a wiper drive with a wiper motor. A power takeoff shaft of the wiper motor, via a motor crank and connecting rods, drives other cranks that are solidly connected to a drive shaft for each windshield wiper.

If in a vehicle there are two windshield wipers that run in the same direction, then as a rule the windshield wiper on the driver's side is driven by the motor crank via a connecting rod pivotably connected to it and by a further crank, while the windshield wiper on the passenger side is often driven via a connecting rod and a transversely jointed linkage, which is connected via its drive lever to the connecting rod. The kinematics of the transversely jointed linkage generates a combined reciprocating and swiveling motion of the windshield wiper, making it better able to follow the angular contour of a vehicle window and enabling it to sweep over even peripheral regions, especially in the upper portion of the windshield.

In conventional wiper systems, the two windshield wipers are driven either directly or in series. In a direct drive, the two connecting rods are pivotably connected to the motor crank at a plurality of ball pins, or at a double ball pin. So that only slight forces on the connecting rods will be obtained, the motor crank has a relatively great length. This means a long radius of the crank path, which along with the usually low ratio of the crank radius to the rod length, of approximately ¼ to ⅐, requires a correspondingly large structural volume and space for motion for the wiper linkage.

From European Patent Disclosure EP 0 781 691 A1, a wiper drive in the form of a series drive is known that comprises a wiper motor and a lever gear. An offset-bent motor crank is seated on the power takeoff shaft of the wiper motor. A connecting rod, which is pivotably connected to the motor crank via a crank joint, is likewise pivotably connected, by its free end, via a crank joint to a crank embodied as a crank plate, which is secured to a drive shaft of a windshield wiper. The crank plate is engaged, via a further crank joint, by a second connecting rod which is pivotably connected by its free end to a crank that is secured to a drive shaft for a second windshield wiper. The lever gear comprising the cranks and connecting rods is very complicated and requires a great deal of space for motion. Furthermore, the parts of the wiper linkage up to the first windshield wiper must be dimensioned such that the forces required for the second windshield wiper can be transmitted as well. The result is a very complicated wiper linkage that is heavy in weight and uses a great deal of material.

Wiper drives with reversible wiper motors are also known, in which the motor crank executes a virtually semicircular swiveling motion. This drive requires markedly less space for motion for the motor crank, as determined by a semicircular motion of the relatively long motor crank.

From the journal "Werkstatt und Betrieb", Carl Hanser Verlag, Munchen, 1995, pages 812–815, and the offprint from the journal "Metallumformtechnik", Claus Dannert Verlag, 1994, entitled "Präzisions-Werkstüfcke in Leichtbauweise, hergestellt durch Innenhochdruck-Umformen" ["Precision Workpieces of Lightweight Design, made by Internal High-Pressure Reshaping"], a method for reshaping tubes into workpieces is known. This method, which is employed above all for the automotive industry, uses high pressures.

The tubular piece to be reshaped is placed in a split tool, in which the desired workpiece shape has been machined. The tool, which is mounted in a press, is closed by a vertical press ram. The ends of the tubular piece are closed by closing tools, through which a pressure medium is delivered that presses the walls of the tube against the inner tool mold. Horizontally acting rams exert an axial pressure on the tube, which is superimposed on the internal pressure. Thus the material that is required for the reshaping is taken not only from the wall thickness of the tubular piece but also made available by the shortening of the tube. The closing tools are made to follow axially during the reshaping.

SUMMARY OF THE INVENTION

According to the invention, in a wiper system with two windshield wipers, a first connecting rod is pivotably connected directly to a motor crank connected solidly to a power takeoff shaft of a wiper motor. A second connecting rod, spaced apart from the crank joint, is connected to the first connecting rod via a joint. While the crank joint moves along a circular curved path, or in the case of reversing wiper motors a semicircular curved path, the joint for the second connecting rod moves along an elliptical or semielliptical curved path that is offset from the other windshield wiper. Because of the shallower drive motion and the longer connecting rod, the second connecting rod requires less space for motion. This favorable kinematic situation is further improved by the transversely jointed linkage. The possibility also exists, by varying the spacing of the joints from one another, of adapting the location of the wiper motor relative to the wiper bearings with a great deal of freedom to the available space in the vehicle.

Since the first connecting rod up to the hinge pin for the second connecting rod must also absorb forces and moments for the second windshield wiper drive, it is advantageous to reinforce the binding of the crank joint and of the joint for the second connecting rod. To that end, according to the invention, at least in the region of a bearing shell for the crank joint and of a hinge pin for the second connecting rod, the first connecting rod is embodied with double walls.

In one feature of the invention, the connecting rod is a sheet-metal part with a substantially U-shaped cross-sectional profile, which in the region of the bearing shell comes to a shallow end toward the open boundary of the U-shaped profile, so that an offset bend is formed between the bearing shell and the hinge pin. In the region of the bearing shell and the hinge pin, the connecting rod has a reinforcement part. The reinforcement part extends parallel to the sheet-metal part and is advantageously riveted to the sheet-metal part on one end by the rivet head of the hinge pin. In the region of the offset bend, the reinforcement part extends with spacing from the sheet-metal part, and as a result a hollow chamber is formed and the shape rigidity is enhanced. At the end of the connecting rod, the reinforcement part and the sheet-metal part have openings located one above the other, into which a plastic bearing shell for the crank joint is injected.

It is expedient that in the injection of the bearing shell, the reinforcement part is fixed to the sheet-metal part in addition to the hinge pin. One option is for the reinforcement part to be formed onto the sheet-metal part in the longitudinal direction and to bent over transversely to the longitudinal direction in the region having the U-shaped cross section. Expediently, the reinforcement part extends into the region of the legs of the U-shaped profile and in this region likewise has a U-shaped cross section, and the legs of the reinforcement part at least partly cover the legs of the sheet-metal part. If the legs of the U-shaped profiles diverge and if the reinforcement part has a slight oversize, then this part, under initial tension can be made to contact the sheet-metal part without play. The result is an improved bracing effect.

A further option is for the reinforcement part, at its opening for the bearing shell, to have a formed-on centering collar, which engages the corresponding opening of the sheet-metal part and thus assures both centering and fixation, so that the forces are better introduced into the connecting rod. In this case, the reinforcement part can either be formed onto the sheet-metal part or be a separate component. Forming the reinforcement part on has a logistical advantage, because the number of components is reduced.

The connecting rod can also advantageously have a hollow profile, which is deformed by an internal high-pressure method in such a way that the reinforcement part, remote from the hinge pin, is deformed toward the other part in the region of the hinge pin and is riveted to that part by the rivet head of the hinge pin. The hollow profile can also be produced by swaging. Swash riveting is for instance used as a method for this. In the heavily stressed region of the first connecting rod, between the bearing shell and the hinge pin, however, the hollow profile is preserved, so that a shape-stable binding is produced.

According to the invention, the reinforcement is limited to the region around the bearing shell and the hinge pin, so that otherwise the wiper linkage is manufactured with a normally usual cross section. This saves both weight and material. The concept of a direct drive can also be preserved even if the motor has to be positioned close to the wiper bearing.

BRIEF DECRIPTION OF THE DRAWINGS

Further advantages will become apparent from the ensuing drawing description. In the drawing, exemplary embodiments of the invention are shown. The drawing, specification and claims include numerous characteristics in combination. One skilled in the art will expediently consider the characteristics individually as well and put them together to make useful further combinations.

Figure 2:
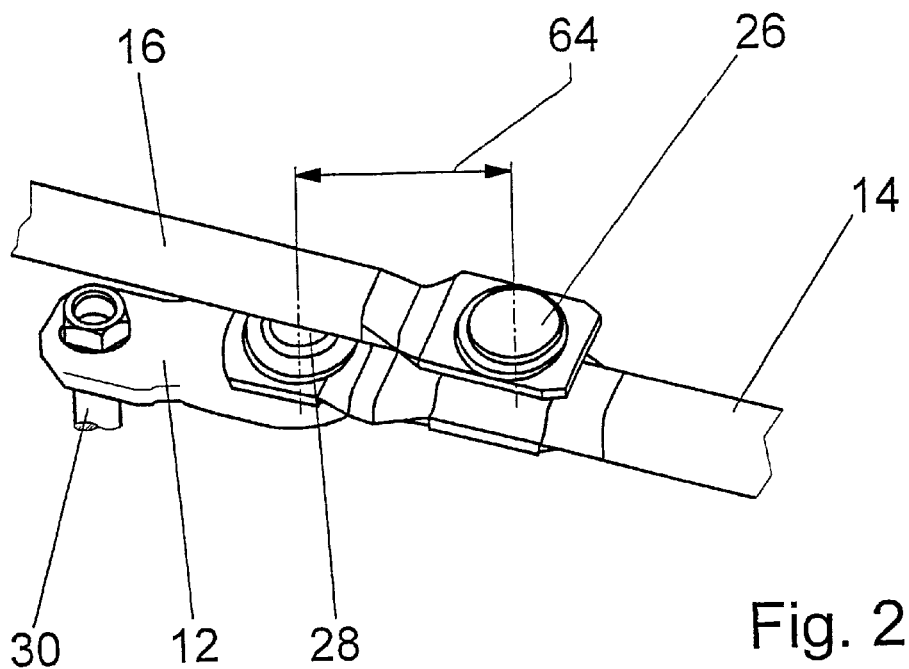
Figure 3:
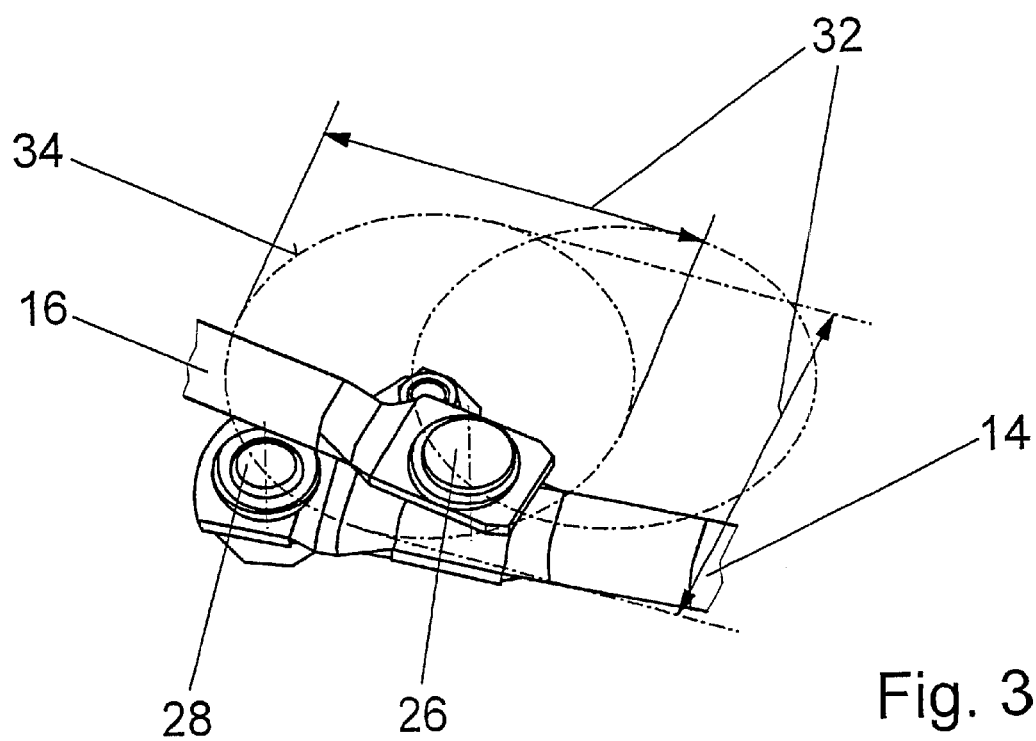

Shown are:

FIG. 1, a perspective view of a wiper system of the invention;

FIG. 2, a fragmentary view in the region of a motor crank;

FIGS. 3–4, a view of curved paths of the pivot points;

FIG. 5, a fragmentary longitudinal section through a connecting rod of the invention;

FIG. 6, a section through a connecting rod taken along a line VI—VI of FIG. 5;

FIGS. 7–9, variants of FIG. 5; and

FIGS. 10–11, variants of FIG. 6.

DESCRIPTION OF THE PREFERRED EMBODIMENTS

Of a wiper system 10 for two windshield wipers, those parts essential to the invention are shown. A motor crank 12 is seated on a motor shaft 30 of a wiper motor that is not otherwise shown. Pivotably connected to the motor crank, at a crank joint 28, is a first connecting rod 14, to whose other end a crank 18 is pivotally connected that is connected to a drive shaft 22 for a driver-side windshield wiper. A second connecting rod 16 is pivotably connected to the first connecting rod 14 via a joint 26. The free end of the second connecting rod 16 simultaneously forms a drive lever 72 of a transversely jointed linkage 20 that is connected to a drive shaft 24 for a passenger-side windshield wiper (FIG. 1).

The crank joint 28 and the joint 26 have a spacing 64 (FIG. 2) from one another that can be adapted to the conditions of the installation space. Depending on whether or not a reversible wiper motor is used, the motor crank 12 executes a semicircular or a circular motion, and the crank joint 28 describes a curved path 34 that is likewise circular or semicircular and that has a diameter 32 (FIG. 3). The curved path 34 is at the same time the curved drive path for the driver-side windshield wiper. Because of the spacing 64 between the joints 26 and 28, the joint 26 moves along a shallower, elliptical curved path 36 (FIG. 4). The length 38 is equal to the diameter 32, while the width 40 is markedly shorter. As a rule, the curved path 34 forms the curved drive path for the passenger-side windshield wiper. The connecting rod 14 is offset-bent in the region between the joint 26 and the crank joint 28, to make enough freedom of motion possible relative to one another and to other components.

The connecting rod 14 is a sheet-metal part 42, which has both a bearing shell 46 for pivotable connection to the motor crank 12 and a hinge pin 50 for pivotably connecting the second connecting rod 16 (FIG. 5). The sheet-metal part 42, in the region of the bearing shell 46 and the hinge pin 50, has a reinforcement part 44, which is also of sheet metal. The sheet-metal part 42 and the reinforcement part 44, on one end of the connecting rod 14, have an opening 48 at which they are joined congruently before the bearing shell 46 is formed on by injection molding. The reinforcement part 44 is offset-bent in such a way that in the region of the bearing shell 46 it rests on the sheet-metal part 42 and then adjoining that in the longitudinal direction forms a hollow chamber 52 with it and then is bent again toward the sheet-metal part 42 in the region of the hinge pin 50. At that point, the two parts 42, 46 are riveted to one another. The hollow chamber 52 reinforces the connecting rod 14 in the region of the greatest stresses.

In a variant of the invention, the reinforcement part 44, at its opening 48, has a formed-on centering collar 54, with which it is retained in the opening 48 of the sheet-metal part 42 (FIG. 7). As a result, the connection between the sheet-metal part 42 and the reinforcement part 44 in the region of the opening 48 is reinforced by a positive engagement, and the resistance to tensile and compressive forces is additionally increased. Moreover, no shear forces can act on the bearing shell 46. The version in FIG. 8 has a sheet-metal part 42 with a reinforcement part 56 that is formed on in the region of the bearing shell 46. Before the bearing shell 46 is injected, the reinforcement part 56 is bent over, specifically in such a way that the formed-on centering collar 54 engages the opening 48 of the sheet-metal part 42.

In contrast to the sheet-metal part 42, which in all the versions has a U-shaped profile at least in the region of the hinge pin 50, the reinforcement part 44 is either embodied as a shallow sheet-metal part (FIG. 6), or it too has a U-shaped profile (FIG. 10). In each case, the reinforcement part 44 is located inside the U-shaped profile of the sheet-metal part 42. If both parts are embodied as U-shaped, then it is expedient for the legs 60 and 62 to diverge slightly, and for the legs 62 of the reinforcement part 44 to have a slight oversize, so that under an initial tension they contact the insides of the sheet-metal part 42. Because of the initial tension, a permanent connection between the sheet-metal part 42 and the reinforcement part 44 is attained that does not loosen even under dynamic loads.

In the version of FIG. 9, the connecting rod 14 is a sheet-metal part 58, which is formed from a hollow profile. It is given its final form with the aid of an internal high-pressure method. The lower part serves as a reinforcement part 56 and in the region of the bearing shell 46 rests flatly on the opposite wall of the sheet-metal part 58. The openings 48 are flush. In the region of the hinge pin 50, the reinforcement part 56 is bent toward the other wall, and it is riveted to that wall by the rivet head 70 of the hinge pin 50. In the region in between, the hollow profile is preserved, specifically in the longitudinal direction and in cross section, so that the connecting rod 14 has high resistance to bending and torsion (FIG. 11). The offset bend 68 between the bearing shell 46 and the hinge pin 50 is attained by providing that the upper wall of the hollow profile is deformed, in the region of the bearing shell 46, toward the lower boundary of the hollow profile.

In all the versions of the invention, the bearing shell 46 is a plastic part and has spherical bearing shells 66. The connecting rod 50 is likewise embodied as a crank joint. The bearing shell 66 can also be embodied as a cylindrical surface.

What is claimed is:

1. A wiper system (10) having a wiper motor, which via a motor crank (12), seated on a motor shaft (30), and two connecting rods (14, 16) drives a drive shaft (22, 24) of two windshield wipers, wherein a first connecting rod (14) is pivotably connected directly to the motor crank (12) via a first joint, while a second connecting rod (16) is connected to the first connecting rod (14), in spaced-apart fashion from a crank joint (28), via a second joint (26), the first connecting rod (14) substantially has a U-shaped cross-sectional profile and is formed as a sheet-metal part (42, 58), which at least in the region of a bearing shell (46) and a hinge pin (50) is embodied with double walls, and a reinforcement part (44, 56) protruding into the open U-shaped profile is bent in the region of the hinge pin (50) toward the other sheet-metal part (42, 58) and is riveted to the latter.

2. The wiper system (10) of claim 1, wherein the second connecting rod (16) drives the drive shaft (24) of a second windshield wiper via a transversely jointed linkage (20).

3. The wiper system (10) of claim 1, wherein the hinge pin (50) has a rivet head (70), with which the reinforcement part (44, 56) is riveted to the other sheet-metal part (42, 58).

4. The wiper system (10) of claim 1, wherein the reinforcement part (44) is formed in the longitudinal direction on the sheet-metal part (42) and is bent on the end of the connecting rod (14) by approximately 180° transversely to the longitudinal direction.

5. The wiper system (10) of claim 1, wherein the reinforcement part (44) in the region of the hinge pin (50) has a U-shaped profile, whose legs (62) at least partly cover legs (60) of the sheet-metal part (42).

6. The wiper system (10) of claim 5, wherein the legs (60, 62) of the U-shaped profiles diverge slightly and rest on one another with an initial tension.

7. The wiper system (10) of claim 1, wherein the reinforcement part (44), at an opening (48) for the bearing shell (46), has a centering collar (54) and with it engages a corresponding opening in the sheet-metal part (42).

8. The wiper system (10) of claim 1, wherein the sheet-metal part (58) is formed from a tubular profile.

9. The wiper system (10) of claim 8, wherein the sheet-metal part (58) is produced by an internal high-pressure method.

10. The wiper system (10) of claim 1, wherein first the connecting rod (14), between the region of the bearing shell (46) and the hinge pin (50), has an offset bend (68).

11. The wiper system (10) of claim 1, wherein the reinforcement part (44, 56) extends in spaced-apart fashion from the sheet-metal part (42, 58) in the region of the offset bend (68) and forms a hollow chamber (52).

12. The wiper system (10) of claim 1, wherein the bearing shell (46) and/or the hinge pin (50) is embodied as a crank joint.

13. The wiper system (10) of claim 1, wherein the wiper motor formed as a reversible wiper motor is used for the drive.

* * * * *